(12) United States Patent
Bordes et al.

(10) Patent No.: US 12,525,873 B2
(45) Date of Patent: Jan. 13, 2026

(54) BOOST CONVERTER AND METHOD FOR BOOST CONVERTER

(71) Applicant: NXP USA, Inc., Austin, TX (US)

(72) Inventors: Laurent Bordes, Aucamville (FR); Julien Burro, Deyme (FR); Tristan Bosvieux, Plaisance du Touch (FR)

(73) Assignee: NXP USA, Inc., Austin, TX (US)

( * ) Notice: Subject to any disclaimer, the term of this patent is extended or adjusted under 35 U.S.C. 154(b) by 317 days.

(21) Appl. No.: 18/321,333

(22) Filed: May 22, 2023

(65) Prior Publication Data

US 2023/0387790 A1 Nov. 30, 2023

(30) Foreign Application Priority Data

May 25, 2022 (EP) ..................... 22305771

(51) Int. Cl.
 *H02M 1/36* (2007.01)
 *H02M 3/156* (2006.01)

(52) U.S. Cl.
 CPC ............. *H02M 1/36* (2013.01); *H02M 3/156* (2013.01)

(58) Field of Classification Search
 CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
 See application file for complete search history.

(56) References Cited

U.S. PATENT DOCUMENTS

| 7,501,805 B2 | 3/2009 | Chen et al. |
| 8,508,196 B2 * | 8/2013 | Deguchi .............. H02M 1/36 323/284 |
| 8,717,001 B2 | 5/2014 | Bernardon et al. |
| 9,484,800 B2 | 11/2016 | Faingersh et al. |

(Continued)

FOREIGN PATENT DOCUMENTS

| EP | 1630936 A2 | 3/2006 |
| EP | 1630936 A3 | 3/2006 |

*Primary Examiner* — Jeffrey A Gblende

(57) ABSTRACT

The present invention relates to a DC-DC boost converter which ensures a fast start until the desired output voltage is reached without causing a high input current during the start phase. In particular, the limitation of the input current is influenced according to the initial output voltage. The invention also relates to a method for the boost converter.

18 Claims, 5 Drawing Sheets

(56) References Cited

U.S. PATENT DOCUMENTS

| | | | |
|---|---|---|---|
| 9,923,463 B2* | 3/2018 | Yuan | H02M 3/158 |
| 10,205,390 B1* | 2/2019 | Chakraborty | H02M 3/158 |
| 11,075,577 B2* | 7/2021 | Clavette | H02M 3/156 |
| 11,245,332 B1* | 2/2022 | Houston | H02M 1/32 |
| 2012/0206121 A1 | 8/2012 | Evans et al. | |
| 2018/0006560 A1 | 1/2018 | Mascioli et al. | |

* cited by examiner

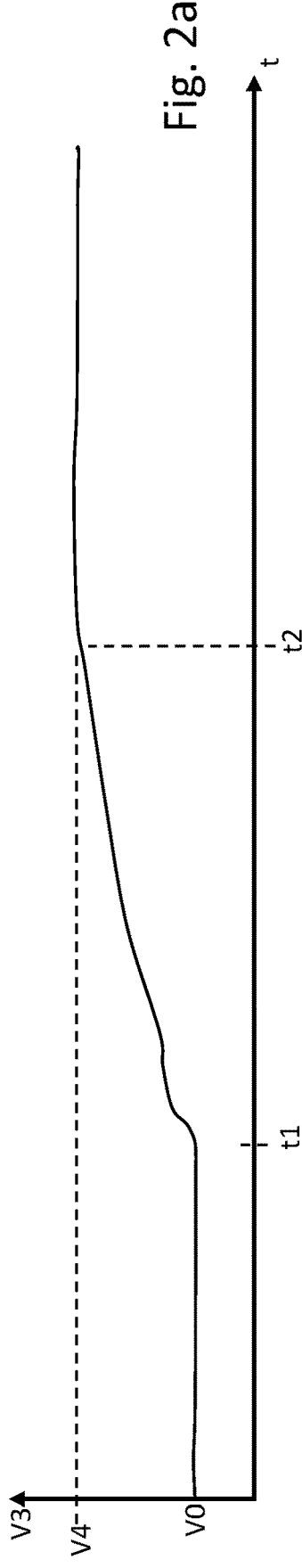
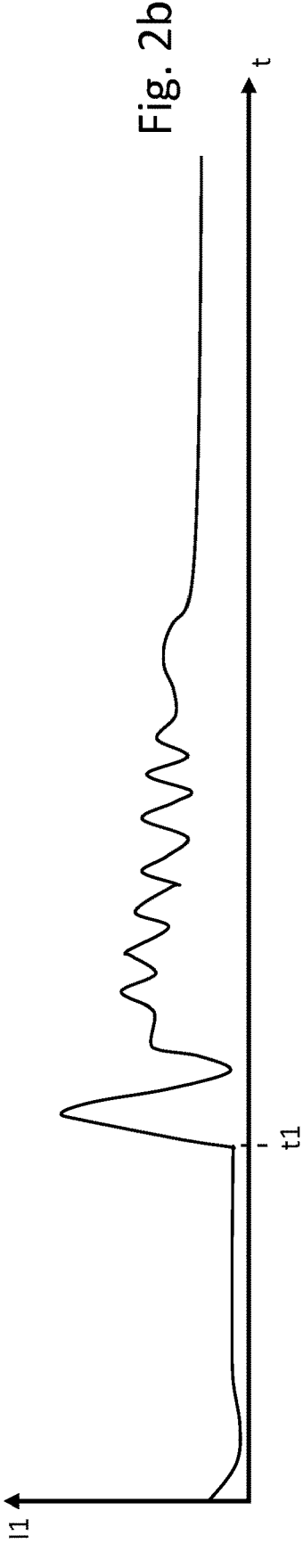
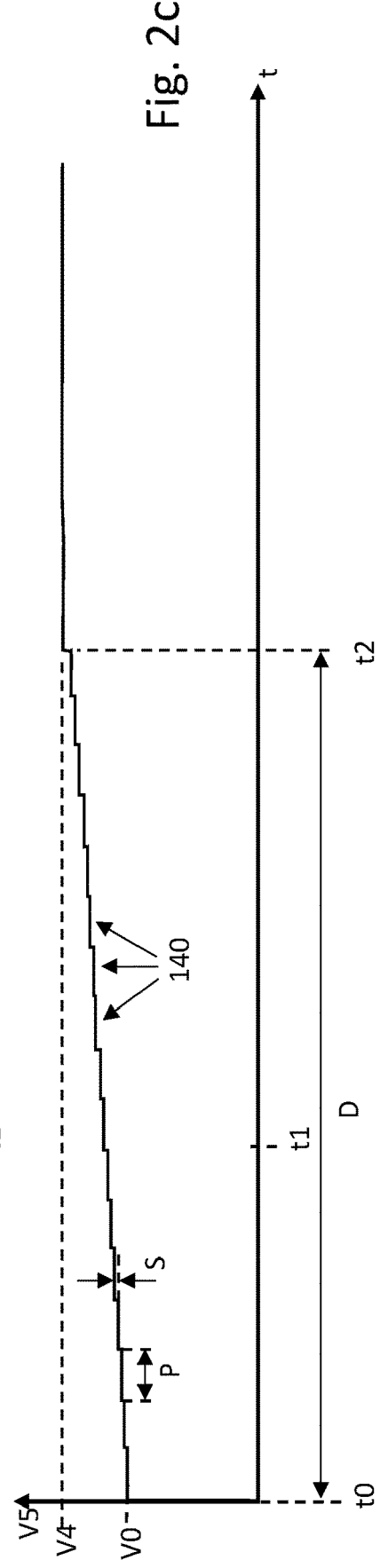

BOOST CONVERTER AND METHOD FOR BOOST CONVERTER

CROSS-REFERENCE TO RELATED APPLICATIONS

This application claims the priority under 35 U.S.C. § 119 of European Patent application no. 22305771.2, filed on 25 May 2022, the contents of which are incorporated by reference herein.

TECHNICAL FIELD

The present disclosure relates to a DC-DC boost converter and a method for the boost converter.

BACKGROUND

DC-DC boost converters are widely used for example in automotive applications to support cold-crank or start-stop features. DC-DC boost converters may provide a stable output for the ECU (Electronic Control Unit) of an automotive vehicle. DC-DC boost converters may be directly connected to the battery of the vehicle such that the DC-DC boost converters is able to provide an output that is suitable for applications that need to stay fully functional under low battery conditions.

In other examples, DC-DC boost converters may operate behind a step down converters to provide higher voltages for applications which may require such higher voltages.

A DC-DC boost converter may draw high instantaneous input current when first switched on. Such a current may be referred to as an inrush current. Inrush currents may require overcurrent protections for DC-DC boost converters.

SUMMARY

Aspects of the disclosure are defined in the accompanying claims.

In accordance with a first aspect of the present disclosure, a DC-DC boost converter is provided. The DC-DC boost converter may also be referred to as the boost converter. The boost converter comprising: an input interface for supplying an input voltage to the boost converter, an output interface for providing an output voltage, an inductor, a first semiconductor switch, a capacitor, a rectifier, preferably either provided by a diode or another second semiconductor switch, a control unit, a sensor unit, and a reference signal generating unit, wherein the inductor and the first semiconductor switch are arranged in a first circuit path between terminals of the input interface, wherein the rectifier and the first semiconductor switch are arranged in a second circuit path between terminals of the output interface, wherein the capacitor is arranged in a third circuit path between the terminals of the output interface, wherein the control unit is coupled to the first semiconductor switch to control the first semiconductor switch with a periodic control signal, wherein the sensor unit is configured to measure the output voltage and to generate a sensor signal representing the measured output voltage, wherein the sensor unit is coupled to the control unit to transmit the sensor signal to the control unit, wherein the reference signal generation unit is configured to generate a first reference signal representing a ramped-shaped increasing reference voltage such that an initial value of the reference voltage is set by an initial value of the output voltage at an activation of the boost converter, and wherein the control unit is configured to generate the control signal for controlling the first semiconductor switch depending on a first difference between the measured output voltage and the reference voltage.

In one or more embodiments, the reference signal generating unit is an integral part of the control unit.

In one or more embodiments, the reference signal generating unit is arranged separately from the control unit.

In one or more embodiments, the control unit comprises a first reference input, wherein the reference signal generating unit is coupled to the first reference input of the control unit to transmit the first reference signal from the reference signal generating unit to the control unit.

In one or more embodiments, the sensor unit is coupled to the reference signal generating unit to transmit the sensor signal to the reference signal generating unit, wherein the reference signal generating unit is configured to detect the activation of the boost converter based on the sensor signal.

In one or more embodiments, the reference signal generating unit is configured to generate the first reference signal such that the first reference signal represents the reference voltage in the form of a stepwise increasing ramp over time.

In one or more embodiments, the reference signal generating unit is configured to generate the first reference signal such that the first reference signal represents the reference voltage in the form of the ramp comprising at least 10 steps.

In one or more embodiments, the reference signal generating unit is configured to generate the first reference signal such that a lowest step of the ramp is determined by the initial value of the output voltage at the activation of the boost converter.

In one or more embodiments, the reference signal generating unit is configured to generate the first reference signal such that each step of the first reference signal lasts a predetermined step period.

In one or more embodiments, wherein each step period is between 10 μs and 50 μs.

In one or more embodiments, the reference signal generating unit is configured to update the reference voltage represented by the first reference signal as each further step is reached.

In one or more embodiments, the reference signal generating unit is configured to generate the first reference signal such that a top step of the ramp of the reference voltage is determined by a final value.

In one or more embodiments, wherein the final value is predetermined.

In one or more embodiments, the control unit comprises a second reference input interface for receiving a second reference signal representing a target voltage for the output voltage, wherein the control unit is configured to generate the control signal for controlling the first semiconductor switch depending on a second difference between the output voltage and the target voltage, if the reference voltage represented by the first reference signal is at least equal to the target voltage.

In accordance with a second aspect of the present disclosure, a method for a DC-DC boost converter is provided. The boost converter comprising an input interface for supplying an input voltage to the converter, an output interface for providing an output voltage, an inductor, a first semiconductor switch, a rectifier, preferably either provided by a diode or another second semiconductor switch, a capacitor, a control unit, a sensor unit, and a reference signal generating unit, wherein the inductor and the first semiconductor switch are arranged in a first circuit path between the terminals of the input interface, wherein the rectifier and the first semiconductor switch are arranged in a second circuit path between the terminals of the output interface, wherein the capacitor is arranged in a third circuit path between the terminals of the output interface, wherein the control unit is coupled to the first semiconductor switch, wherein the sensor unit is coupled to the control unit. The method comprising the steps:

a) the control unit controlling the first semiconductor switch with a periodic control signal,
b) the sensor unit measuring the output voltage and generating a sensor signal representing the measured output voltage,
c) the sensor unit transmitting the sensor signal to the control unit,
d) the reference signal generation unit generating a first reference signal representing a ramped-shaped increasing reference voltage such that an initial value of the reference voltage is set by an initial value of the output voltage at an activation of the boost converter, and
e) the control unit generating the control signal for controlling the first semiconductor switch depending on a first difference between the measured output voltage and the reference voltage.

In accordance with a third aspect of the present disclosure, a computer program is provided, comprising executable instructions which, when executed by a processing unit, cause the processing unit being configured to control the boost converter to carry out the method of claim 15.

DESCRIPTION OF DRAWINGS

Embodiments of the present disclosure will be described in more detail with reference to the appended drawings, in which:

FIGS. 2a to 2c show signal diagrams.

DESCRIPTION OF EMBODIMENTS

Figure 1:
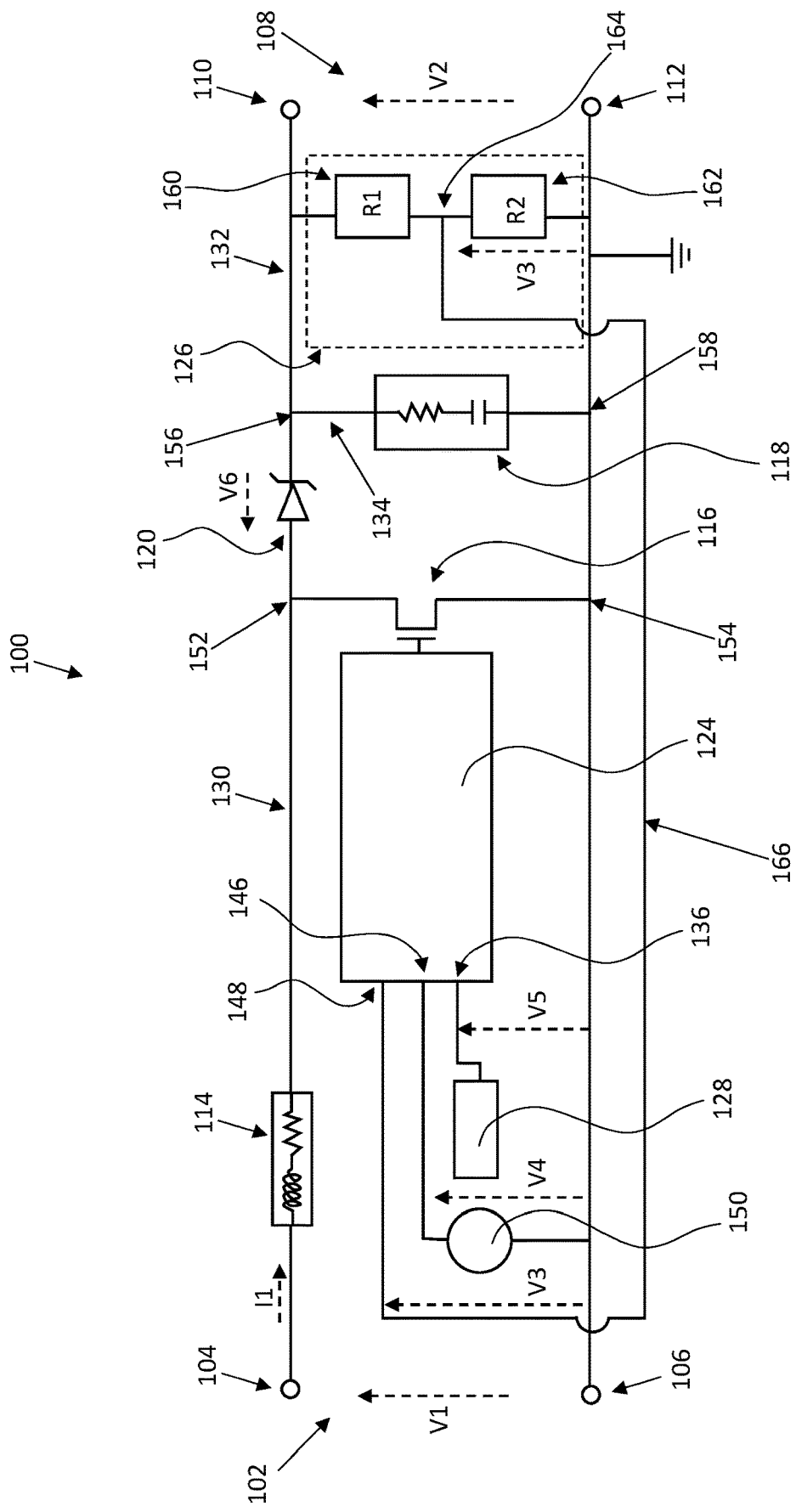
FIG. 1 shows a simplified block diagram of a boost converter.

FIG. 1 schematically illustrates one embodiment of a boost converter 100. The boost converter 100 may also be referred to as a step-up converter. The boost converter 100 is preferably configured as a DC-DC boost converter. The boost converter 100 includes an input interface 102. The input interface 102 is used to supply the boost converter 100 with an input voltage V1, which is preferably a DC voltage. The input interface 102 may include a first terminal 104 and a second terminal 106. The input voltage V1 may be applied between the two terminals 104, 106.

The boost converter 100 further comprises an output interface 108. The output interface 108 is used to provide an output voltage V2, which is preferably a DC voltage. The output voltage V2 is generated by the boost converter 100. The output interface 108 may include a third terminal 110 and a fourth terminal 112. The output voltage V2 may be generated between the two terminals 110, 112 by the boost converter 100.

The output voltage V2 is usually always higher than the input voltage V1.

The boost converter 100 further comprises an inductor 114, a first semiconductor switch 116, a capacitor 118, a rectifier 120, and a control unit 124.

The inductor 114 and the first semiconductor switch 116 are arranged in a first circuit path 130 of the boost converter 100. The first circuit path 130 extends between the two terminals 104, 106 of the input interface 102. In the embodiment shown in FIG. 1, the first circuit path 130 extends from the first terminal 104 to the node 152, from the first node 152 to the second node 154, and from the second node 154 to the second terminal 106 of the input interface. The inductor 114 is disposed in the portion of the first circuit path 130 extending from the first terminal 104 to the first node 152. The first semiconductor switch 116 is disposed in the portion of the first circuit path 130 extending from the first node 152 to the second node 154.

The rectifier 120 and the first semiconductor switch 116 are disposed in a second circuit path 132 of the boost converter 100. The second circuit path 132 extends from the third terminal 110 to the first node 152, from the first node 152 to the second node 154, and from the second node 154 to the fourth terminal 112. Thus, the partial path between the first node 152 and the second node 154 forms both a partial path of the first circuit path 130 and a partial path of the second circuit path 132. As previously explained, the first semiconductor switch 116 is disposed in the sub-path between the first node 152 and the second node 154. The rectifier 120 is disposed in the sub-path of the second circuit path 132 extending from the third terminal 110 to the first node 152. The forward direction of the rectifier 120 is from the first node 152 to the third terminal 110.

The capacitor 118 is disposed in a third circuit path 134 of the boost converter 100 between the terminals 110, 112 of the output interface 108. The third circuit path 134 extends from the third terminal 110 to a third node 156, from the third node 156 to a fourth node 158, and from the fourth node 158 to the fourth terminal 112. The third node 156 is also disposed in the second circuit path 132 between the third terminal 110 and the rectifier 120. Thus, the sub-path between the third terminal 110 and the third node 156 may be a common sub-path of the second circuit path 132 of the third circuit path 134. The fourth node 158 may be located in the sub-path of the second circuit path 132 between the fourth terminal 112 and the third node 156, or alternatively on the third node 156. Thus, the sub-path between the fourth terminal 112 and the fourth node 158 may be a common sub-path of the second circuit path 132 and the third circuit path 134. The capacitor 118 is disposed in the sub-path of the third circuit path 134 between the third node 156 and the fourth node 158.

In principle, it is possible for other electrical components to be arranged in the circuit paths. For example, an electrical impedance, in particular an electrical resistor, may be arranged in the partial path between the first terminal 104 and the first node 152 in addition to the inductor 114. The inductor 114 and the electrical impedance may form a common unit arranged in said partial path. In another example, an electrical impedance, in particular an electrical resistor, may be arranged in the sub-path between the third node 156 and the fourth node 158 in addition to the capacitor 118. The capacitor 118 and the electrical impedance may also form a common unit that may be disposed in said partial path.

In an example, the rectifier 120 may be formed by a diode, in particular a Schottky diode. The diode may also be referred to as a freewheeling diode. In another example, the rectifier may be formed by a second semiconductor switch. The second semiconductor switch may be controlled by the control unit 124 such as to cause the same function as the diode.

The basic structure and operation of a boost converter 100 is well known. If the first semiconductor switch 116 is closed, at least a major portion of the input voltage V1 drops across the inductor 114. While the first semiconductor switch 116 is closed, the current through the inductor 114 increases and so does the energy stored in the magnetic field. If the semiconductor switch 116 is opened, the current flow through the inductor 114 is initially maintained and decreases exponentially. Therefore, immediately after the semiconductor switch 116 is opened, a former current continues to flow through the rectifier 120 and the capacitor 118, charging the capacitor 118. By repeatedly opening and closing the first semiconductor switch 116, the capacitor 118 can be charged until a desired output voltage V2 is provided between the terminals 110, 112 of the output interface 108.

During the start-up phase of the boost converter 100, the capacitor 118 is often pre-charged. A large voltage difference may occur between the targeted output voltage to be obtained and the actual output voltage V2 at the output interface 108. A very rapid charging of the capacitor 118 to a charge value that causes the actual output voltage V2 present at the output interface 108 to reach the desired output voltage causes often a large inrush current I1 through the first circuit path 130. However, a large inrush current I1 through the first circuit path 130 should be avoided to prevent overvoltage at the output interface 108. In principle, the first semiconductor switch 116 could be controlled by the control unit 124 such that the inrush current I1 increases only slowly during the start phase of the boost converter 100. However, the slow rise of the inrush current I1 often results in a not inconsiderably long delay time until the boost converter 100 is fully operational. There is therefore a need to design the boost converter 100 in such a way that the boost converter 100 is ready for operation in a particularly short time (with an output voltage to be achieved) and at the same time large inrush currents I1 are avoided.

In the embodiment as schematically shown in FIG. 1, the control unit 124 is coupled to the first semiconductor switch 116. The first semiconductor switch 116 may be configured as a MOS-FET transistor. The control unit 124 may be coupled to a control input node of the first semiconductor switch 116 via a signal connection, such that the first semiconductor switch 116 may be opened and closed in a controlled manner by the control unit 124. In an example, the control unit 124 may be configured to generate a control signal, wherein the control signal is directed to the control input node of the first semiconductor switch 116 via the signal connection. The control signal is a periodic control signal, such that the first semiconductor switch 116 is periodically opened and closed based on the control signal. The control signal may be configured as a pulse width modulated, PWM, control signal. Depending on the duty cycle of the PWM control signal, the duty cycle in which the first semiconductor switch 116 is closed may be controlled by the control unit 124. The control unit 124 may be configured to vary the duty cycle of the PWM control signal to cause a larger or a smaller output voltage V2 at the output interface 108. For example, to achieve a larger output voltage V2, the control unit 124 may increase the duty cycle of the PWM control signal. To achieve a smaller output voltage V2, the control unit 124 may decrease the duty cycle of the PWM control signal.

The boost converter 100 includes a sensor unit 126. The sensor unit 126 is arranged and/or configured to measure the output voltage V2 at the output interface 108. In an example, the sensor unit 126 may be coupled between the third terminal 110 and the fourth terminal 112 of the output interface 108 to allow the output voltage V2 to be measured at the output interface 108. In FIG. 1, an example of the sensor unit 126 is shown schematically. In this example, the sensor unit 126 includes a series connection of a first impedance 160 and a second impedance 162. The series connection causes a voltage divider of the output voltage V2. At a fifth node 164 between the first impedance 160 and the second impedance 162, the sensor voltage V3 may be measured, in particular as the voltage drop across the second impedance 162. Because of the voltage divider, the sensor voltage V3 is proportional to the output voltage V2. If the output voltage V2 changes, there is a proportional change in the sensor voltage V3. Therefore, the sensor voltage V3 may represent the output voltage V2. Further, the sensor unit 126 is configured to indirectly measure the output voltage V2 by directly measuring the sensor voltage V3. The sensor unit 126 is configured to generate a sensor signal representing the indirectly measured output voltage V2. In the example shown in FIG. 1, the sensor signal may be formed by the respective measured sensor voltage V3.

The sensor unit 126 is coupled to the control unit 124 to transmit the sensor signal to the control unit 124. A signal line 166 may extend from the sensor unit 126 to the control unit 124, so that the sensor signal may be transmitted via the signal line 166. In an example, the signal line 166 may extend from the fifth node 164 to a signal input 148 of the control unit 124. The signal input 148 may also be referred to as the sensor input 148. The sensor signal continuously communicates the current output voltage V2 to the control unit 124.

In an example, the control unit 124 comprises a further signal input 136. This signal input 136 may also be referred to as the first reference input 136. Preferably, the reference signal generation unit 128 is coupled to the first reference input 136 of the control unit 124. A signal line may be provided for coupling. The reference signal generation unit 128 may be configured to transmit the first reference signal to the control unit 124, preferably via said signal line to the first reference input 136. The control unit 124 may be configured to receive, via the first reference input 136, the first reference signal representing a reference voltage V5. The control unit 124 may be configured to generate the PWM control signal for controlling the first semiconductor switch 116 depending on the current output voltage V2 and the current value of the reference voltage V5. The reference voltage V5 may represent a at least a portion of a desired voltage that the output voltage V2 should reach. If the current output voltage V2 is less than the reference voltage V5, there is a difference between the current output voltage V2 and the reference voltage V5. This difference may also be referred to as an error. The control unit 124 may be configured to control the PWM control signal for controlling the first semiconductor switch 116 depending on the difference, so that the difference becomes small or zero if possible. A closed loop control system may be formed with the sensor unit 126, the signal connection 166, and the control unit 124. The closed loop control system may be configured to control the output voltage V2 to the reference voltage V5.

If the difference between the actual output voltage V2 and the reference voltage V5 is very large when the boost converter 100 is activated (started up), the large difference may lead to the issue of causing a large inrush current I1. However, the large inrush current I1 should be avoided. For this purpose, the boost converter 100 has a reference signal generation unit 128. The reference signal generation unit 128 may be physically separate from the control unit 124.

The reference signal generation unit 128 is configured to generate a first reference signal representing a ramping reference voltage V5. Thus, the reference voltage V5 increases as time progresses. The reference signal generation unit 128 is further configured to generate the first reference signal such that the initial value of the reference voltage V5 is determined based on and/or determined by an initial value of the output voltage V2 upon an activation of the boost converter 100. Thus, the initial value of the reference voltage V5 is not necessarily identical to the initial value of the output voltage V2. As previously explained, a sensor signal representing the output voltage V2 is generated by the sensor unit 126. Therefore, when the boost converter 100 is activated, the sensor signal will also initially represent the initial value of the output voltage V2. For example, the initial value of the output voltage V2 may be represented by an initial value of the sensor voltage V3. In an example, the reference signal generation unit 128 is configured to generate the first reference signal such that the initial value of the reference voltage V5 is identical to the initial value of the sensor voltage V3. The initial value of the sensor voltage V3 represents the initial value of the output voltage V2, and thus indirectly determines the initial value of the reference voltage V5.

The control unit 124 is configured to generate the PWM control signal for controlling the first semiconductor switch 116 depending on a first difference. The first difference is formed by a difference between the measured output voltage (V3) and the reference voltage V5. The control unit 124 may be configured to determine the first difference. The measured output voltage may be represented by the current measured sensor voltage V3. Therefore, the first difference may be formed by a difference between the currently measured sensor voltage V3 and the reference voltage V5. The first reference signal generated by the reference signal generation unit 128 represents the ramping reference voltage V5. The ramping reference voltage V5 may mean that the value of the reference voltage V5 increases with the time. The reference voltage V5 may increase stepwise after every predefined period of time for each step.

The first reference signal represents the reference voltage V5 such that the value of the reference voltage V5 increases with time. Therefore, the current reference voltage V5 represented by the first reference signal may be used to determine the first difference. The control unit 124 may be configured to generate the PWM control signal for controlling the first semiconductor switch 116 depending on the respective current first difference, wherein the current first difference is formed by a current difference between the currently measured sensor voltage V3 and the current value of the reference voltage V5. The control unit 124 may be configured to update the first difference, in particular to synchronize the update of the first difference to the change in steps of the reference voltage V5. The control unit 124 may also be configured to update the PWM control signal after each update of the first difference. Thus, both the update of the PWM control signal and the update of the first difference may be synchronized with the first reference signal and/or the reference signal generation unit 128.

The initial value of the reference voltage V5 is determined by the initial value of the output voltage V2. It was explained earlier that the initial value of the reference voltage V5 can be identical to the initial value of the sensor voltage V3. By fixing the initial value of the reference voltage V5 in such a manner, it can be ensured that the inrush current I1 does not increase abruptly with the activation of the boost converter 100. Furthermore, the aforementioned determination of the initial value of the reference voltage V5 offers the advantage that the current I1 through the inductor 114 is increased without a time delay or with at most a very small time delay in order to achieve as quickly as possible that the output voltage V2 reaches the output voltage to be achieved. The magnification of the output voltage V2 to reach the output voltage to be achieved is caused by the first reference signal representing a ramping reference voltage V5.

The embodiment of the previously explained boost converter 100 therefore offers the advantage that, after the associated activation, the boost converter 100 quickly reaches the output voltage to be achieved at the output interface 108 and at the same time prevents a very large inrush current I1 from occurring.

In FIG. 2a, an example of a signal waveform of the sensor voltage V3 is shown plotted over time t. In FIG. 2b, an example of a signal waveform of the current I1 is shown plotted over time t. In FIG. 2c, an example of a signal waveform of the reference voltage V5 is shown plotted over time t. The signal characteristics for the current I1 and the sensor voltage V3 result from the signal characteristic of the reference voltage V5.

In an example it shall be assumed that the boost converter 100 is activated at the time t0. When the boost converter 100 is activated, the sensor unit 126 measures the output voltage V2 and generates a sensor signal based on the measured output voltage V2. In the example, the sensor signal is determined by the sensor voltage V3. The sensor voltage V3 is transmitted to the sensor input 148 of the control unit 124 via the signal line 166. When the boost converter 100 is switched on (activated), the initial value V0 is measured as sensor voltage V3 by the sensor unit 126 and transmitted as a sensor signal to the control unit 124.

The control unit 124 may be configured to transmit the initial value V0 of the sensor voltage V3 to the reference signal generation unit 128. To transmit the initial value V0, the control unit 124 may be coupled to the reference signal generation unit 128 via a signal connection.

The reference signal generation unit 128 generates the first reference signal and transmits this first reference signal to the first reference input 136 of the control unit 124 via a signal connection. In an example, the first reference signal represents the reference voltage V5, which is shown schematically in FIG. 2c and increases in a ramp-like manner. The initial value of the reference voltage V5 at time t0 is determined by the initial value V0 of the sensor voltage V3. As time t progresses, the reference voltage V5 increases in several steps 140. With each step 140, the reference voltage V5 increases. This results in the ramping reference voltage V5.

A voltage V6, which may be small, often drops across the rectifier 120. This voltage may also be referred to as the rectifier voltage V6. Due to the rectifier voltage V6, the reference voltage V5 increases in several steps up to the time t1 before a noticeable current I1 is caused at the inductor 114 starting at the time t1. The reference voltage V5 also increases in steps after the time t2. By increasing the reference voltage V5 by a relatively small value (for instance between 10 mV and 50 mV) from step to step, it is possible to prevent a particularly large current I1 from being caused by the inductor 114.

In an example, the control unit 124 is configured to re-determine the first difference with each step of the reference voltage V5 and, based on this first difference, adjust the PWM control signal to control the first semiconductor switch 116, thereby controlling the first semiconductor switch 116 accordingly. Therefore, by gradually increasing the reference voltage V5, the output voltage V2 at the output interface 108 of the boost converter 100 also increases. However, due to the operation of the boost converter and the inductive and capacitive components, the output voltage V2 will not have a step-like shape. This is also reflected in the sensor voltage V3 of FIG. 2a, which is proportional to the output voltage V2.

In an example, the reference voltage V5 is increased in several steps 140 until the reference voltage V5 reaches a target voltage V4 at time t2. This target voltage V4 may also be a voltage to be reached for the sensor voltage V3. For example, the control unit 124 may be configured such that the PWM control signal is generated by the control unit 124 such that when the reference voltage V5 reaches the target voltage V4, the sensor voltage V5 is regulated to a target voltage V4.

Overall, the boost converter 100 achieves the advantage that the period D between the time t0 and the time t2 can be kept particularly small without the current I1 through the inductor 114 being particularly large.

In the embodiment of the boost converter 100 of FIG. 1, the rectifier 120 is schematically shown as a diode. In an example, the rectifier 120 may be configured as a diode or comprise at least one diode. The diode may be configured as a Schottky diode. However, in principle, it is also possible for the rectifier 120 to include a second semiconductor switch (not shown) controlled by the control unit 124 to provide rectification of the signal through the path between the first node 152 and the third node 156. The second semiconductor switch may include an integrated diode.

Provided that the boost converter 100 for the rectifier 120 comprises a Schottky diode, the boost converter 100 is preferably configured as an asynchronous boost converter. Provided that the boost converter 100 for the rectifier 120 comprises a second semiconductor switch, the boost converter 100 is preferably configured as a synchronous boost converter.

Figure 3:
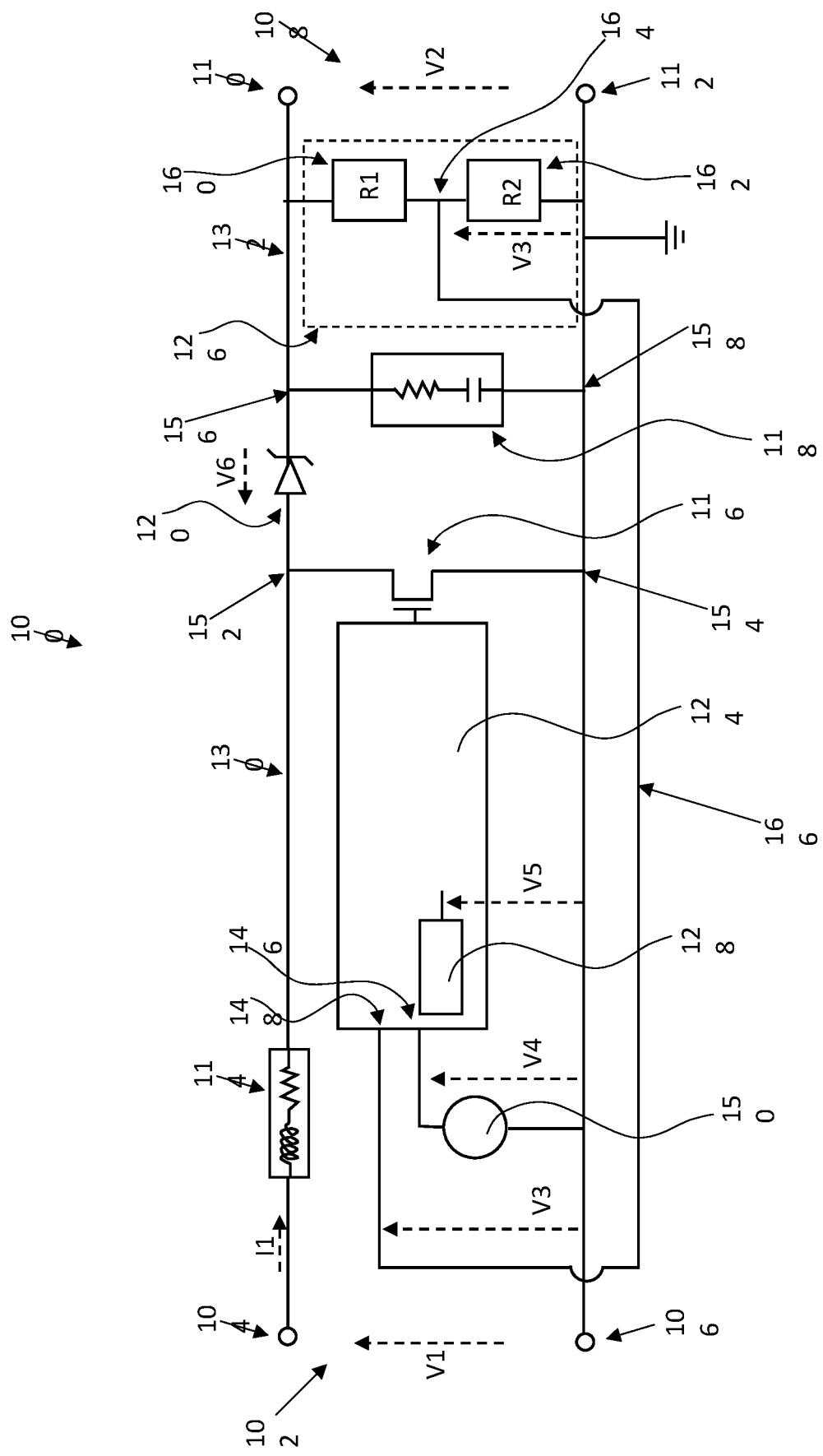
FIGS. 3 and 4 show simplified block diagrams of further embodiments the boost converter.

FIG. 3 schematically illustrates a further embodiment of the boost converter 100. The boost converter 100 of FIG. 3 corresponds essentially to the boost converter of FIG. 1, so that the preceding explanations, preferred features, technical effects and advantages are referred to in an analogous manner. The boost converter 100 of FIG. 3 differs from the boost converter 100 of FIG. 1 in that the reference signal generation unit 128 is formed as an integral part of the control unit 124. The first reference input 136 can therefore be omitted.

Figure 4:
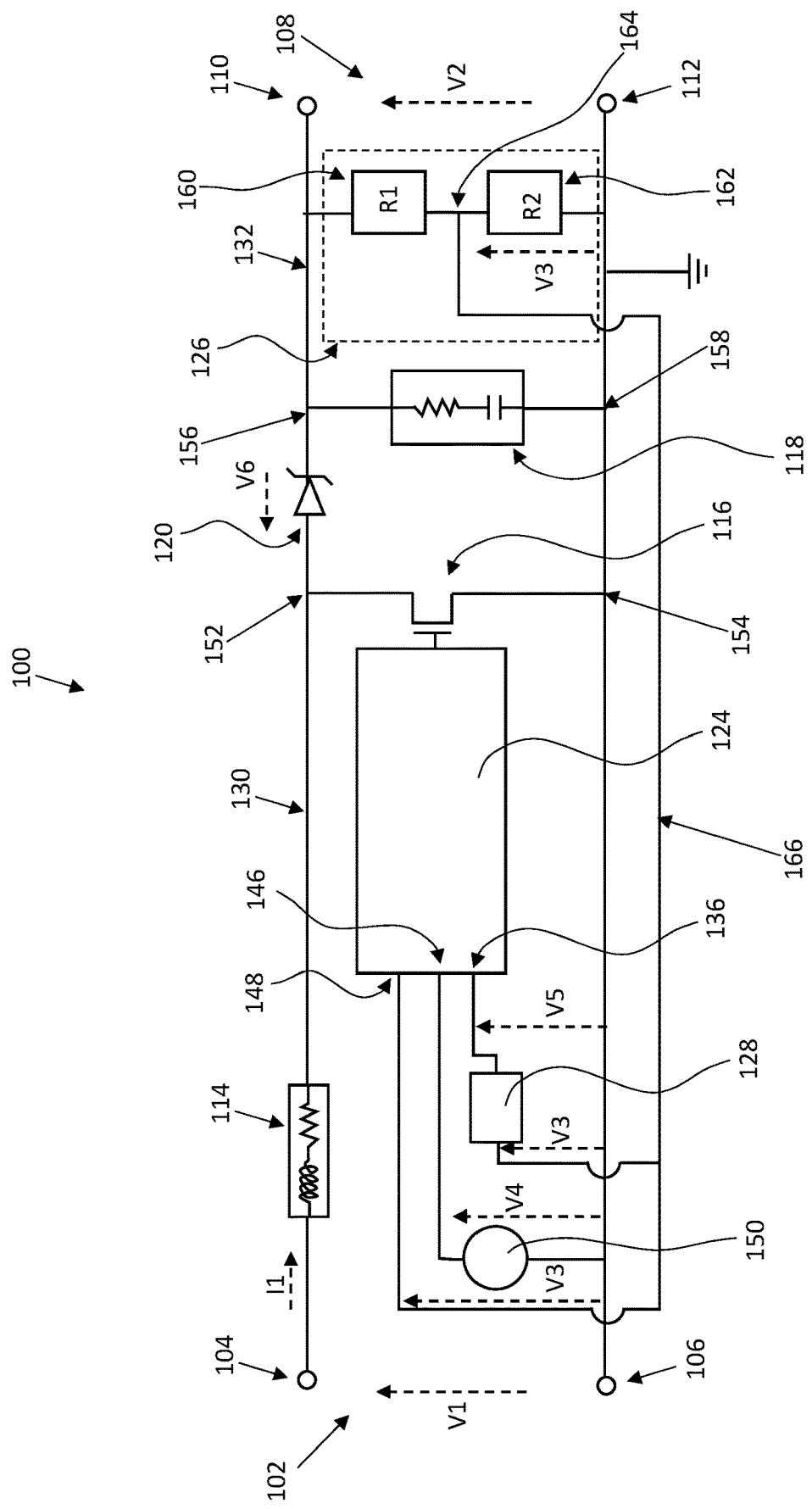

FIG. 4 schematically illustrates another embodiment of the boost converter 100. The boost converter 100 of FIG. 4 corresponds substantially to the boost converter of FIG. 1, so that the preceding explanations, preferred features, technical effects and advantages are referred to in an analogous manner. The boost converter 100 of FIG. 4 differs from the boost converter 100 of FIG. 1 in that the sensor unit 126 is further coupled to the reference signal generation unit 128. In an example, the signal line 166 may branch such that the signal line 166 extends to both the reference signal generation unit 128 and the sensor input 148. By coupling the sensor unit 126 to the reference signal generation unit 128, it is achieved that the sensor signal is also transmitted to the reference signal generation unit 128.

Preferably, the reference signal generation unit 128 is configured to detect activation of the boost converter 100 based on the sensor signal V3. Simultaneously with detecting the activation of the boost converter 100, the reference signal generation unit 128 may detect the initial value V0 of the sensor signal V3. The initial value V0 of the sensor signal V3 may be used by the reference signal generation unit 128 to determine the initial value of the reference voltage V5. In other words, the reference signal generation unit 128 may be configured to generate the first reference signal such that the initial value of the reference voltage V5 for a lowest step 140 of the ramp is determined by the initial value of the sensor voltage V3 or by the initial value of the output voltage V2 when the boost converter 100 is activated. In this regard, reference is made to the preceding explanations in an analogous manner.

After the reference signal generating unit 128 determines the initial value of the reference voltage V5, the reference signal generating unit 128 generates the first reference signal such that the first reference signal represents the reference voltage V5 in the form of a gradually increasing ramp over time t, the ramp starting with the initial value of the reference voltage V5. Preferably, the ramp comprises at least ten steps 140. FIG. 2c schematically illustrates an example of the reference voltage V5 in the form of a stepwise increasing ramp with a plurality of steps 140. The duration of each step 140 is referred to as the step period P. Preferably, the step period P of each of the steps 140 is of equal duration. In an example, the step period P may be between 10 μs and 50 μs. In a preferred example, the step period P for each step 140 may be about 20 μs. With each new step 140, the reference voltage V5 is increased by a predetermined voltage, also referred to as the step voltage S. The step voltage S is preferably between 10 mV and 30 mV. The upper limit of the step voltage S prevents a particularly large current I1 through the inductor 114, and the lower limit of the step voltage S ensures that the target output voltage at the output interface 108 can be achieved in a short time frame. However, the number of steps 140 and/or the step voltage S may be adapted to the ambient conditions in a practical application.

In an example, the reference signal generation unit 128 is configured such that the reference signal generation unit 128 updates the reference voltage V5 represented by the first reference signal at each step 140. Preferably, the control unit 124 is configured such that the control unit 124 updates the PWM control signal for controlling the first semiconductor switch 116 continuously or at each step change of the first reference signal. The control unit 124 and/or the reference signal generation unit 128 may be configured and/or coupled such that the updating of the first reference signal and the updating of the control signal are synchronized. Updating the control signal has the advantage of preventing or minimizing a time loss of the adjustment of the control signal after the updating of the reference voltage V5.

In an example, the reference signal generation unit 128 may be configured to generate the first reference signal such that an uppermost step of the ramp of the reference voltage V5 is determined by a final value. The final value may be predetermined. In an example, the reference signal generation unit 128 may store a data set representing the final value. However, it is also possible for the reference signal generation unit 128 to include an interface (not shown) such that the final value of the reference signal generation unit 128 may be predetermined via the interface.

In an example, the control unit 124 may be configured to use the reference voltage V5 represented by the first reference signal only up to a target voltage V4.

The control unit 124 of the boost converters 100 of FIGS. 1 and 4 includes a second reference input 146 for receiving a second reference signal. The second reference signal may represent the target voltage V4. The second reference input 146 may be adapted to provide the control unit 124 with the target voltage V4, up to which the reference voltage V5 represented by the first reference signal is to be used. The first reference signal may be received by the control unit 124 via the first reference input 136.

In an example, the control unit 124 is configured to generate the PWM control signal for controlling the first semiconductor switch 116 depending on a difference between the output voltage V2 (or sensor voltage V3) and the target voltage V4 while the reference voltage V5 represented by the first reference signal is at least equal to the target voltage V4. Thus, the control unit 124 may be configured to generate the PWM control signal for controlling the first semiconductor switch 116 depending on a first difference between the measured output voltage V2 (in particular being represented by sensor voltage V3) and the reference voltage V5 while the reference voltage V5 is less than the target voltage V4. Once the reference voltage V5 reaches the target voltage V4, the control unit 124 may generate the PWM control signal for controlling the first semiconductor switch 116 depending on a difference between the measured output voltage V2 (in particular being represented by sensor voltage V3) and the target voltage V4. The transition with respect to the difference from the reference voltage V5 to the target voltage V4 may cause the output voltage V2 to reach a target level represented by the target voltage V4.

In an example, the boost converter 100 may include a target signal generation unit 150. The target signal generation unit 150 may be configured to generate the target voltage V4. Further, the target signal generation unit 150 may be coupled to the second reference input 146 to transmit the target voltage V4 to the control unit 124.

Figure 5:
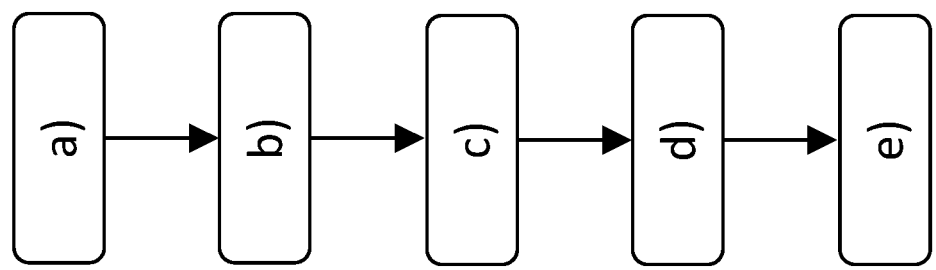
FIG. 5 shows a simplified flow chart of the method.

In one embodiment according to the present disclosure, a flowchart of a method for a boost converter 100 is schematically shown in FIG. 5. The boost converter is preferably a DC to DC boost converter 100. The boost converter 100 comprises an input interface 102 for supplying an input voltage V1 to the boost converter 100, an output interface 108 for providing an output voltage V2, an inductor 114, a first semiconductor switch 116, a rectifier 120, a capacitor 118, a sensor unit 126, and a reference signal generating unit 128. The rectifier 120 may be formed by a diode or a second semiconductor switch. The inductor 114 and the first semiconductor switch 116 are arranged in a first circuit path 130 between the terminals 104, 106 of the input interface 102. The rectifier 120 and the first semiconductor switch 116 are arranged in a second circuit path 132 between the terminals 110, 112 of the output interface 108. The capacitor 118 is disposed in a third circuit path 134 between the terminals 110, 112 of the output interface 108. The second circuit path 132 may be partially configured integrally with the first circuit path 130 and/or the third circuit path 134. The control unit 124 is coupled to the first semiconductor switch 116. As a result, the control unit 124 can control the semiconductor switch 116. The sensor unit 126 is coupled to the control unit 124. In an example, the method comprises the following steps:

a) controlling the first semiconductor switch 116 by the control unit 124 with a periodic PWM control signal;

b) measuring the output voltage V2 by the sensor unit 126 and generating a sensor signal representing the measured output voltage V2;

c) transmitting the sensor signal by the sensor unit 126 to the control unit 124;

d) the reference signal generating unit 128 generates a first reference signal representing a ramped reference voltage V5 such that the initial value of the reference voltage is set by an initial value of the output voltage V2 upon activation of the boost converter 100; and e) the control unit generates the PWM control signal for controlling the first semiconductor switch 116 depending on a first difference between the measured output voltage V2 and the reference voltage V5.

Although the described exemplary embodiments disclosed herein focus on devices, methods for using same, the present disclosure is not necessarily limited to the example embodiments illustrate herein.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

Unless stated otherwise, terms such as "first", "second", "third", etc. are used to arbitrarily distinguish between the elements such terms describe. Thus, these terms are not necessarily intended to indicate temporal or other prioritization of such elements.

What is claimed is:

1. A DC-DC boost converter, comprising:
    an input configured to supply an input voltage to the boost converter,
    an output configured to provide an output voltage,
    an inductor coupled to the input,
    a first semiconductor switch coupled between the inductor and a reference potential,
    a rectifier coupled to the inductor, the first semiconductor switch, and the output,
    a capacitor coupled to the rectifier, the reference potential, and the output;
    a control unit,
    a sensor unit, and
    a reference signal generating unit,
    wherein the control unit is coupled to the first semiconductor switch to control the first semiconductor switch with a periodic control signal,
    wherein the sensor unit is configured to measure the output voltage and to generate a sensor signal representing the measured output voltage,
    wherein the sensor unit is coupled to the control unit to transmit the sensor signal to the control unit,
    wherein the reference signal generation unit is configured to generate a first reference signal representing a ramped-shaped increasing reference voltage such that an initial value of the reference voltage is set by an initial value of the output voltage at an activation of the boost converter, and
    wherein the control unit is configured to generate the control signal for controlling the first semiconductor switch depending on a first difference between the measured output voltage and the reference voltage;
    wherein the reference signal generating unit is configured to generate the first reference signal such that the first reference signal represents the reference voltage in the form of a stepwise increasing ramp over time; and
    wherein the reference signal generating unit is configured to generate the first reference signal such that a lowest step of the ramp is determined by the initial value of the output voltage at the activation of the boost converter.

2. The boost converter of claim 1, wherein the reference signal generating unit is an integral part of the control unit.

3. The boost converter of claim 1, wherein the reference signal generating unit is arranged separately from the control unit.

4. The boost converter of claim 1, wherein the control unit comprises a first reference input, and wherein the reference signal generating unit is coupled to the first reference input of the control unit to transmit the first reference signal from the reference signal generating unit to the control unit.

5. The boost converter of claim 1, wherein the sensor unit is coupled to the reference signal generating unit to transmit the sensor signal to the reference signal generating unit, and wherein the reference signal generating unit is configured to detect the activation of the boost converter based on the sensor signal.

6. The boost converter of claim 1, wherein the control unit comprises a first reference input, and wherein the reference signal generating unit is coupled to the first reference input of the control unit to transmit the first reference signal from the reference signal generating unit to the control unit, and wherein the sensor unit is coupled to the reference signal generating unit to transmit the sensor signal to the reference signal generating unit, and wherein the reference signal generating unit is configured to detect the activation of the boost converter based on the sensor signal.

7. The boost converter of claim 1, wherein the reference signal generating unit is configured to generate the first reference signal such that the first reference signal represents the reference voltage in the form of the ramp comprising at least 10 steps.

8. The boost converter of claim 1, wherein the reference signal generating unit is configured to generate the first reference signal such that each step of the first reference signal lasts a predetermined step period.

9. The boost converter of claim 8, wherein each step period is between 10 μs and 50 μs.

10. The boost converter of claim 8, wherein each step period is between 10 μs and 50 μs.

11. The boost converter of claim 9,
wherein the reference signal generating unit is configured to update the reference voltage represented by the first reference signal as each further step is reached.

12. The boost converter of claim 11,
wherein the reference signal generating unit is configured to generate the first reference signal such that a top step of the ramp of the reference voltage is determined by a final value.

13. The boost converter of claim 12,
wherein the final value is predetermined.

14. The boost converter of claim 13,
wherein the control unit comprises a second reference input interface for receiving a second reference signal representing a target voltage for the output voltage, and wherein the control unit is configured to generate the control signal for controlling the first semiconductor switch depending on a second difference between the output voltage and the target voltage, if the reference voltage represented by the first reference signal is at least equal to the target voltage.

15. The boost converter of claim 1,
wherein the control unit comprises a second reference input interface for receiving a second reference signal representing a target voltage for the output voltage, and wherein the control unit is configured to generate the control signal for controlling the first semiconductor switch depending on a second difference between the output voltage and the target voltage, if the reference voltage represented by the first reference signal is at least equal to the target voltage.

16. A method for a DC-DC boost converter comprising
an input configured to supply an input voltage to the converter,
an output configured to provide an output voltage,
an inductor coupled to the input,
a first semiconductor switch coupled between the inductor and a reference potential,
a rectifier coupled to the inductor, the first semiconductor switch, and the output,
a capacitor coupled to the rectifier, the reference potential, and the output,
a control unit,
a sensor unit, and
a reference signal generating unit,
wherein the control unit is coupled to the first semiconductor switch, wherein the sensor unit is coupled to the control unit, and
wherein the method comprising the steps:
a) the control unit controlling the first semiconductor switch with a periodic control signal,
b) the sensor unit measuring the output voltage and generating a sensor signal representing the measured output voltage,
c) the sensor unit transmitting the sensor signal to the control unit,
d) the reference signal generation unit generating a first reference signal representing a ramped-shaped increasing reference voltage such that the initial value of the reference voltage is set by an initial value of the output voltage at an activation of the boost converter, and
e) the control unit generating the control signal for controlling the first semiconductor switch depending on a first difference between the measured output voltage and the reference voltage;
wherein the reference signal generating unit generates the first reference signal in step d) such that the first reference signal represents the reference voltage in the form of a stepwise increasing ramp over time; and
wherein the reference signal generating unit generates the first reference signal in step d) such that a lowest step of the ramp is determined by the initial value of the output voltage at the activation of the boost converter.

17. The method of claim 16,
wherein each step of the first reference signal lasts a predetermined step period,
wherein each step period is between 10 μs and 50 μs.

18. A DC-DC boost converter, comprising:
an input configured to supply an input voltage to the boost converter,
an output configured to provide an output voltage,
an inductor coupled to the input,
a first semiconductor switch coupled between the inductor and a reference potential,
a rectifier coupled to the inductor, the first semiconductor switch, and the output,
a capacitor coupled to the rectifier, the reference potential, and the output;
a control unit,
a sensor unit, and
a reference signal generating unit,
wherein the control unit is coupled to the first semiconductor switch to control the first semiconductor switch with a periodic control signal,
wherein the sensor unit is configured to measure the output voltage and to generate a sensor signal representing the measured output voltage,
wherein the sensor unit is coupled to the control unit to transmit the sensor signal to the control unit,
wherein the reference signal generation unit is configured to generate a first reference signal representing a ramped-shaped increasing reference voltage such that an initial value of the reference voltage is set by an initial value of the output voltage at an activation of the boost converter, and
wherein the control unit is configured to generate the control signal for controlling the first semiconductor switch depending on a first difference between the measured output voltage and the reference voltage;
wherein the reference signal generating unit is configured to generate the first reference signal such that the first reference signal represents the reference voltage in the form of a stepwise increasing ramp over time;
wherein the control unit comprises a second reference input interface for receiving a second reference signal representing a target voltage for the output voltage; and
wherein the control unit is configured to generate the control signal for controlling the first semiconductor switch depending on a second difference between the output voltage and the target voltage, if the reference voltage represented by the first reference signal is at least equal to the target voltage.

* * * * *